United States Patent Office 3,330,884
Patented July 11, 1967

3,330,884
POLYMERIC ULTRAVIOLET LIGHT-ABSORBERS PREPARED BY CONDENSATION OF HYDROXYBENZOPHENONES AND CARBONYL COMPOUNDS
Stanley Tocker, Wilmington, Del., assignor to E. I. du Pont de Nemours and Company, Wilmington, Del., a corporation of Delaware
No Drawing. Filed June 19, 1964, Ser. No. 376,573
8 Claims. (Cl. 260—843)

This invention relates to organic polymeric structures and more particularly to stabilized organic polymeric structures.

Shaped polymeric structures, such as polymeric films and laminates, although widely used in outdoor applications, leave much to be desired in such applications. When used as self-supporting films in constructing green-houses and the like, some polymers become degraded upon prolonged exposure to sunlight. Degradation may take the form of discoloration, surface crazing, a decrease in elongation and flexibility ultimately resulting in embrittlement, etc. Polymeric materials such as polyvinyl fluoride, polyvinylidene fluoride, polytetrafluoroethylene and copolymers of tetrafluoroethylene with hexafluoropropene, while not affected substantially by ultraviolet light themselves, permit transmission of ultraviolet light to such an extent that they offer little protection to substrates when they are used as the outer layers of laminates and the like.

In other polymeric structures, such as those based on polyolefins and polyesters as well as polymeric acrylic and polyester adhesive resins, the polymer itself undergoes degradation under the action of ultraviolet light.

It is known to incorporate materials which exert a stabilizing effect against the degradation of ultraviolet light in such polymeric structures. But in some cases, these materials are not retained effectively in the film structure with the result that the stabilizing or screening action against the transmission of ultraviolet light is lost. And in some cases, stabilizing materials which are retained somewhat effectively have tended to be expensive and add unduly to the cost of the polymeric film structures.

Accordingly, it is an object of this invention to provide polymeric film structures which are in themselves stable toward the degrading action of ultraviolet light and which effectively prevent transmission of ultraviolet light through the polymeric structure.

It is a further object to provide light stabilizing systems which are highly effective over prolonged periods of time and which do not add prohibitively to the cost of manufacture of polymeric shaped structures.

Other objects will become apparent from the following description.

The objects of this invention are accomplished by the discovery of a stabilizing polymer having the formula

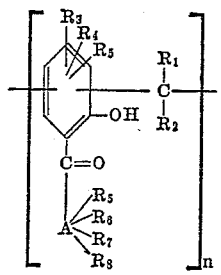

wherein $R_1$ and $R_2$ are selected from the group consisting of hydrogen, alkyl groups having 1 to 6 carbon atoms, chloroalkyl, furyl, vinyl, propenyl and phenyl; $R_3$, $R_4$, $R_5$, $R_6$, $R_7$ and $R_8$ are selected from the group consisting of hydrogen, alkyl, alkoxy and halogen; "A" is an aryl radical; and "n" is an integer having a value of at least 2. The incorporation of this polymer into polymeric structures provides the desired stabilizing effect.

More particularly, this invention resides in the formation of a composition of matter comprising essentially a homogeneous mixture of a polymer selected from the group consisting of polyesters, acrylic resins, and polymers and copolymers of halo-olefin monomers, and from 0.1 to 10% by weight, based on total weight of the mixture, of the stabilizing polymer described above.

The stabilizing polymer is formed by the reaction of a carbonyl compound on a benzophenone, and preferably by the reaction of formaldehyde on 2-hydroxybenzophenone. Accordingly, in the preferred stabilizing polymer, $R_1$, $R_2$, $R_3$, $R_4$, $R_5$, $R_6$, $R_7$ and $R_8$, are hydrogen and "A" is phenyl.

The stabilizing polymer, when incorporated into a polymeric structure, preferably has a molecular weight of 500 or more. In a preferred embodiment of this invention, a polymer formed by the reaction of formaldehyde on 2-hydroxybenzophenone having a molecular weight of at least 500 is incorporated in a halo-olefin polymer such as polyvinyl fluoride to the extent of from 0.5 to 5.0% by weight, based on total weight.

In place of the preferred 2-hydroxybenzophenone, typical ketones which are suitable for preparing the stabilizing agent of this invention include 2-hydroxy-4-methoxybenzophenone, 2-hydroxy-5-tertiarybutylbenzophenone, 2-hydroxy-2′,4′,6′-trimethylbenzophenone, 2-hydroxy-2′,3′,5′,6′-tetramethylbenzophenone, 2-hydroxy-2′,4′-dichlorobenzophenone, 2-hydroxy-2′,4′-dibromobenzophenone, 2-hydroxy-2′,4′-difluorobenzophenone, 2-hydroxyphenyl beta-naphthyl ketone and 2-hydroxyphenyl alpha-naphthyl ketone. Thus the aryl radical, "A," in the formula above can be either phenyl or naphthyl.

As the carbonyl compound there may be employed, in place of formaldehyde, aldehydes such as acetaldehyde, propionaldehyde, chloroacetaldehyde, trimethylacetaldehyde, furfural, butyraldehyde, benzaldehyde, isobutyraldehyde, valeraldehyde, capron-aldehyde, acrolein and crotonaldehyde and ketones such as acetone, methyl ethyl ketone, diethyl ketone and methyl isobutyl ketone.

The following examples illustrate specific embodiments of this invention and are not intended to be limitative.

EXAMPLE I

Part A.—In preparing formaldehyde/2-hydroxy-benzophenone, 50 grams of 30% aqueous formaldehyde was treated dropwise with 39 grams of concentrated sulfuric acid at such a rate as to keep the temperature below 75° C. Then 99 grams of 2-hydroxy-benzophenone was added and the mixture refluxed under nitrogen for 65 hours. The organic phase was extracted with ether and the ether phase was washed with water until the washings were neutral (pH-7). The solvent was stripped in a vacuum oven and the residue was heated at 150° C. (0.3 mm.) for 2 hours. The product was a solid which melted at about 60° C. and showed strong absorption in the ultraviolet region of 3400 A. Molecular weight, as determined by boiling point elevation in benzene, was 560.

Part B.—Next the polymer from Part A was incorporated into polyvinyl fluoride as follows: Following the procedure described in U.S. Patent No. 2,953,818, an organosol was prepared containing 2% by weight of the polymer from Part A above in a mixture containing 40% by weight of polyvinyl fluoride in N,N-dimethylacetamide. The organosol was extruded through a slotted casting hopper maintained at approximately 50° C. into a water bath at about 15° C. The quenched film was heated to 150° C. for 15 minutes to evaporate the solvent and then biaxially oriented following conventional procedures. The polyvinyl fluoride film containing the stabilizing polymer was then tested by first forming laminar structures following the procedure described below.

The polyvinyl fluoride film containing the stabilizing polymer was first treated to improve adherability of the surface by flame-treating the film with a substantially neutral flame following the general procedure outlined in U.S. Patent No. 2,648,097. Several 4-inch by 6-inch pieces of film were each placed on a flat glass plate and a dam formed around its four edges with a length of $\frac{1}{16}$-inch diameter twine. A degassed blend of a polyester formulation consisting of 170 parts by weight of a mixture of about 30% by weight of styrene and 70% by weight of an unsaturated polyester formed by reacting a slight stoichiometric excess of propylene glycol with a mixture consisting of about 60 mol percent of phthalic anhydride and about 40 mole percent of maleic anhydride; 30 parts by weight of methyl methacrylate; 1 part by weight of benzoyl peroxide; 1.2 parts by weight of methyl ethyl ketone hydroperoxide solution (60% solution of methyl ethyl ketone hydroperoxide in dimethyl phthalate); and 0.2 part by weight of a solution consisting of about 6% by weight of cobalt naphthenates, 51% by weight naphthenic acids and 43% by weight of mineral spirits, was poured onto the polyvinyl fluoride film and allowed to flow and spread evenly over the area bounded by the twine. Next a 4-inch by 6-inch piece of chopped strand Fiberglas mat (2 oz./sq. ft.) weighing approximately 9 grams was placed on the polyester polymerized monomer layer. When the resin mixture had welled up through the interstices of the mat, a second 4-inch by 6-inch piece of film of the polyvinyl fluoride containing the stabilizing polymer was placed on top of the mat, followed by sufficient extra weight to establish a pressure of 0.6 ounce per square inch over the 4-inch by 6-inch area. The entire sandwich was then placed in an oven and heated at 100° C. for ½ hour followed by 10 minutes at 150° C. The resulting panel in each case exhibited unbroken surfaces of the polymer blend film over a substrate of a cured polyester.

Laminates made from the 1 mil thick film containing the 2% by weight of the polymer as described above showed no evidence of delamination nor any tendency toward a blushed appearance after exposure in an Atlas Weather-O-Meter for 2000 sun hours (Atlas Sunshine Arc Weather-O-Meter Model XW-R wherein the sample is subjected to a complex environment which includes heat, ultraviolet light, visible light and moisture). In contrast, a similar laminate made with a polyvinyl fluoride film containing no stabilizer showed delamination at 1000 hours of exposure.

In another test, the permanence of the blend of the polymer in the polyvinyl fluoride film was assessed. It was found that the polyvinyl fluoride film, containing 2% of the formaldehyde/2-hydroxybenzophenone polymer at the outset, still contained 2% of the polymer after preparation of the laminate. In contrast, a 1 mil thick polyvinyl fluoride film containing a commercial non-polymeric absorbent, such as "Uvinul 400" (2,4-dihydroxybenzophenone) or "Uvinul D-49" (2,2'-dihydroxy-4,4'-dimethoxybenzophenone), retained only about one-fourth of the original amount in going through the lamination and curing cycle in preparing the laminate.

In still another test, polyvinyl fluoride film containing the stabilizing polymer showed substantially no extraction or loss of said stabilizing polymer after boiling in methyl ethyl ketone, whereas a non-polymeric stabilizer, 2,4-dihydroxybenzophenone, was essentially completely removed in a similar test.

EXAMPLES II–VIII

Following the procedure of Example I, stabilizing polymers were made from the ingredients listed as A and B in the table below. These stabilizing polymers were incorporated in the test films of polymers indicated in the table and were then subjected to evaluation with respect to degradation under the influence of ultraviolet light as described in Example I.

TABLE

| Example | Polymer | | Evaluation in Polymer | |
|---|---|---|---|---|
| | A | B | Polymer | Resistance to UV Light Degradation |
| II | 2-hydroxy-4-methoxybenzophenone | Trimethylacetaldehyde | PVF | [1] 5 |
| III | 2-hydroxy-2',4',6'-trimethylbenzophenone | Formaldehyde | FEP | [1] 4 |
| IV | 2-hydroxy-2',3',5',6'-tetramethylbenzophenone | Benzaldehyde | VCl/VCl$_2$ | [2] 3 |
| V | 2-hydroxy-2',4'-difluorobenzophenone | Acetone | VF$_2$/HFP | [1] 4 |
| VI | 2-hydroxy-2',4'-dichlorobenzophenone | Formaldehyde | PVCl | [2] 3 |
| VII | 2-hydroxy-2',3',5',6'-tetramethyl benzophenone | do | PP | [2] 4 |
| VIII | 2-hydroxybenzophenone | do | PET | [2] 3 |

[1] Newspaper placed underneath film containing stabilizer-time to discolor paper noted and compared with similar time under film with no stabilizer.
[2] Ratio of time for test film to degrade/time for control film (no agent) to degrade.

LEGEND:
PVF—Polyvinyl fluoride.
FEP—Tetrafluoroethylene/hexafluoropropene copolymer.
VCl/VCl$_2$—Vinyl chloride/vinylidene chloride copolymer.
VF$_2$/HFP—Vinylidene fluoride/hexafluoropropene copolymer.
PVCl—Polyvinyl chloride.
PP—Polypropylene.
PET—Polyethylene terephthalate.

The following example shows the improvements resulting from the use of the stabilizing polymers in adhesives:

EXAMPLE IX (a) To a solution of Eastman 910 methyl cyanoacrylate adhesive there was added 1%, by weight of the adhesive solids, of the polymeric product obtained by condensation of formaldehyde with 2-hydroxybenzophenone. This adhesive solution was then used to fasten a strip of rubber to a chromium plated steel substrate. After 12 months' outdoor exposure the rubber strip remained firmly adhered to the substrate; a similar adhesive bond without the added ultraviolet light stabilizer was no longer intact at the end of the time.

(b) To a solution of 17 parts by weight of a 60/40 weight ratio ethylene terephthalate/ethylene sebacate copolyester (prepared as described in U.S. Patent Nos. 2,623,031 and 2,623,033) in 83 parts by weight of carbon tetrachloride was added 1%, by weight, of the polymeric product obtained from condensation of formaldehyde with 2-hydroxyphenyl alpha-naphthyl ketone. A thin layer of this adhesive composition was brushed on one surface of each of two 3-mil thick sheets of polymeric linear terephthalate film. The solvent was evaporated and the adhesive coated sheets were pressed together with a pressure of 500 pounds per square inch at 90° C. for 5 minutes. The adhered laminate was then exposed to a bank of ultraviolet sunlamps for 500 hours. At the end of this time the sheets were still firmly adhered; a control laminate adhered with the same adhesive which did not have the added light stabilizer showed almost no adhesion under the same treatment.

Thus, this invention has the advantage of providing economic polymeric stabilizers whose retention in polyolefins, polyesters, haloolefin polymers, and polyester and acrylic resin adhesives is essentially permanent despite exposure to ultraviolet light, solvents, etc. This outstanding weatherability performance can be especially realized in films and laminar structures for outdoor use. The improved features of these stabilizers also render them useful in adhesives, for example, acrylic and polyester adhesives to provide weatherable bonding of various polymeric laminar structures. They also may be applied as adjuvants to coatings for polymeric films to provide protection against ultraviolet light degradation of the coated substrates.

Other uses and advantages will be obvious to those skilled in the art.

As many widely different embodiments of this invention may be made without departing from the spirit and scope thereof, it is to be understood that this invention is not limited to the specific embodiments thereof except as defined in the appended claims.

What is claimed is:

1. A polymer having the formula

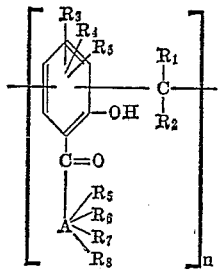

wherein $R_1$ and $R_2$ are selected from the group consisting of hydrogen, alkyl groups having 1–6 carbon atoms, chloroalkyl, and phenyl; $R_3$, $R_4$, $R_5$, $R_6$, $R_7$ and $R_8$ are selected from the group consisting of hydrogen, alkyl, alkoxy and halogen; "A" is an aryl radical; and "n" is an integer having a value of at least 2.

2. The polymer of claim 1 wherein $R_1$, $R_2$, $R_3$, $R_4$, $R_5$, $R_6$, $R_7$ and $R_8$ are hydrogen and "A" is a phenyl radical.

3. A composition of matter comprising essentially a mixture of from 0.1 to 10% by weight, based on total weight of the mixture, of the polymer of claim 1 in another organic polymer.

4. A composition of matter comprising essentially a homogeneous mixture of a polymer selected from the group consisting of polyesters, acrylic resins, and polymers and copolymers of haloolefin monomers, and from 0.1 to 10% by weight, based on total weight of the mixture, of the polymer of claim 1.

5. A composition of matter comprising essentially a homogeneous mixture consisting of polyvinyl fluoride and from 0.1 to 10% by weight, based on total weight of the mixture, of the polymer of claim 1, wherein $R_1$, $R_2$, $R_3$, $R_4$, $R_5$, $R_6$, $R_7$ and $R_8$ are hydrogen and "A" is a phenyl radical.

6. The composition of matter of claim 5 wherein the polymer of claim 1 is from 0.5 to 5% by weight of the total weight of the mixture.

7. Polyvinyl fluoride having incorporated therein 0.5 to 5% by weight, based on total weight, of a polymer derived from the reaction of formaldehyde on 2-hydroxybenzophenone, said polymer having a molecular weight of at least 500.

8. The polymer of claim 1 wherein "n" is an integer having a value of not less than two and not more than three.

References Cited

UNITED STATES PATENTS

| | | | |
|---|---|---|---|
| 2,706,725 | 4/1955 | Umuh et al. | 260—64 |
| 2,777,783 | 1/1957 | Welch | 260—847 |
| 2,916,471 | 12/1959 | Roshl et al. | 260—890 |
| 2,967,787 | 1/1961 | Murphy | 260—64 |
| 3,186,962 | 6/1965 | Ranson | 260—45.95 |
| 3,200,086 | 8/1965 | Coleman | 260—2 |

FOREIGN PATENTS 1,351,170  12/1963  France.

OTHER REFERENCES

Carl Marvel, Organic Chemistry of High Polymers, John Wiley & Son (1959), (pages 24 and 25 relied on).

MURRAY TILLMAN, *Primary Examiner.*

J. T. GOOLKASIAN, *Assistant Examiner.*